United States Patent

[11] 3,612,910

[72] Inventors Clarence E. Cowan
Newberg;
George J. Frye, Portland, both of Oreg.
[21] Appl. No. 58,884
[22] Filed July 28, 1970
[45] Patented Oct. 12, 1971
[73] Assignee Tektronix, Inc.
Beaverton, Oreg.

[54] TRIGGERED PULSE GENERATOR HAVING AUTOMATIC BIAS ADJUSTMENT
9 Claims, 3 Drawing Figs.

[52] U.S. Cl. .......... 307/286, 307/258, 307/296
[51] Int. Cl. .......... H03k 3/315
[50] Field of Search .......... 307/296, 286, 258, 274

[56] References Cited
UNITED STATES PATENTS
3,350,576 10/1967 Zimmerman .......... 307/286 X

*Primary Examiner*—Donald D. Forrer
*Assistant Examiner*—B. P. Davis
*Attorney*—Buckhorn, Blore, Klarquist and Sparkman

ABSTRACT: A triggered pulse generator circuit is described including a tunnel diode or other negative resistance device connected as a bistable switching circuit whose forward bias is automatically adjusted to the proper arming level between trigger pulses. A ramp bias current is applied to the tunnel diode along with a fixed bias current until it switches to a high-voltage state and actuates a voltage level detector. The detector output stops the ramp and causes a memory capacitor to store the maximum ramp current which is added to the fixed bias current to provide an arming current corresponding to the peak current of such tunnel diode minus a predetermined bias current related to the amplitude of the trigger pulse. After the device is reset, the stored arming current is again applied thereto to enable a subsequent trigger pulse to trigger the device and produce an output pulse.

CLARENCE E. COWAN
GEORGE J. FRYE
INVENTORS.

BY
BUCKHORN, BLORE, KLARQUIST & SPARKMAN
ATTORNEYS

TRIGGERED PULSE GENERATOR HAVING AUTOMATIC BIAS ADJUSTMENT

BACKGROUND OF THE INVENTION

The subject matter of the present invention relates generally to triggered pulse generators employing negative resistance devices including current-sensitive devices, such as tunnel diodes or avalanche transistors, or voltage-sensitive devices, such as thyratrons, connected as bistable switching circuits, and in particular to a circuit for automatically adjusting the forward bias of such device to the proper arming level. In the case of current-actuated devices, such as tunnel diodes, the bias current is adjusted to a proper arming current slightly below the peak current point on the negative resistance characteristic curve so that the trigger pulse increases the total device current above the peak current and causes such device to switch from a low-voltage stable state to a high-voltage stable state.

The problem with tunnel diodes and other negative resistance devices is that their forward current characteristics change with temperature, load, manufacturing tolerance, and use lifetime. This causes the peak current point and the arming current level of the device to change and, heretofore, prevented triggering with small-amplitude trigger pulses unless the bias current was manually adjusted to vary the arming current and compensate for such change. Unfortunately, the tunnel diode cannot be triggered with extremely large amplitude trigger signals to overcome this variation of peak current because such trigger signals cause distortion of the waveform of the output pulse of such tunnel diode by reducing the slope at the start of its leading edge and causing overshoot at the top edge. Thus, the trigger pulse only has an amplitude of about 10 percent or less of the peak current of the tunnel diode, which means that the arming bias current of such tunnel diode is on the order of 90 percent or more of such peak current. As a result of the required large arming current, any change in peak current, load, etc., previously had to be compensated by manual adjustment of the bias current. This involves small precise manual adjustments of bias current which must be made quite often and, for this reason, it is troublesome and time consuming. The circuit of the present invention overcomes these disadvantages by automatically adjusting the bias current of the tunnel diode to provide an arming bias current of the proper value which always allows the tunnel diode to be triggered in spite of changes in load or temperature variations of the forward current characteristic of such tunnel diode.

The triggered pulse generator circuit of the present invention is especially useful as the voltage step pulse generator of a time domain reflectometer instrument for testing coaxial cables and other transmission lines, but it may also be used in a sampling type of cathode-ray oscilloscope for triggering the fast ramp generator in the timing unit of such sampling oscilloscope.

Previous triggered pulse generator circuits, such as that shown in U.S. Pat. No. 3,350,576 of H. A. Zimmerman, issued Oct. 31, 1967, have operated to add bias current to the quiescent DC bias current flowing through a tunnel diode to arm such tunnel diode and enable it to be triggered only at certain times. However, such previous circuits have not automatically adjusted the level of the arming bias current to compensate for changes in the load and the forward current characteristic of the tunnel diode, in the manner of the present invention.

It is, therefore, one object of the present invention to provide an improved triggered pulse generator in which the bias applied to a negative resistance switching device therein is automatically adjusted to an arming bias level which enables triggering and thereby compensates for changes in load or in the forward current or voltage characteristic of the device.

Another object of the invention is to provide such a pulse generator in which the switching device is biased to an arming level near the switching point at the start of the negative resistance portion of its forward bias characteristic to enable triggering with trigger pulses of small amplitude.

A further object of the present invention is to provide such a pulse generator in which the device is a tunnel diode connected as a bistable switch and the triggering level of the tunnel diode is automatically determined to produce an arming bias current related to such triggering level which is stored so that such arming current may be applied to such tunnel diode after it is reverted to enable subsequent triggering of the tunnel diode.

Still another object of the present invention is to provide such a pulse generator in which the triggering level of the tunnel diode is determined by adding a ramp-shaped bias current to a substantially constant bias current until the ramp current switches the tunnel diode at its triggering level to actuate a detector means which terminates the ramp current at a maximum value and causes the circuit to store the maximum ramp current which is added to the fixed bias current to provide an arming current equal to the trigger level minus an amount corresponding to a fraction of the trigger pulse amplitude.

An additional object of the invention is to provide such a pulse generator of high sensitivity and stability which can be triggered by low-amplitude trigger pulses with a high reliability to produce output pulses of extremely fast rise time.

BRIEF DESCRIPTION OF THE DRAWINGS

Other objects and advantages of the present invention will be apparent from the following detailed description of the preferred embodiment thereof and from the attached drawings of which.

DESCRIPTION OF THE PREFERRED EMBODIMENT

Figures 1, 2, 3:
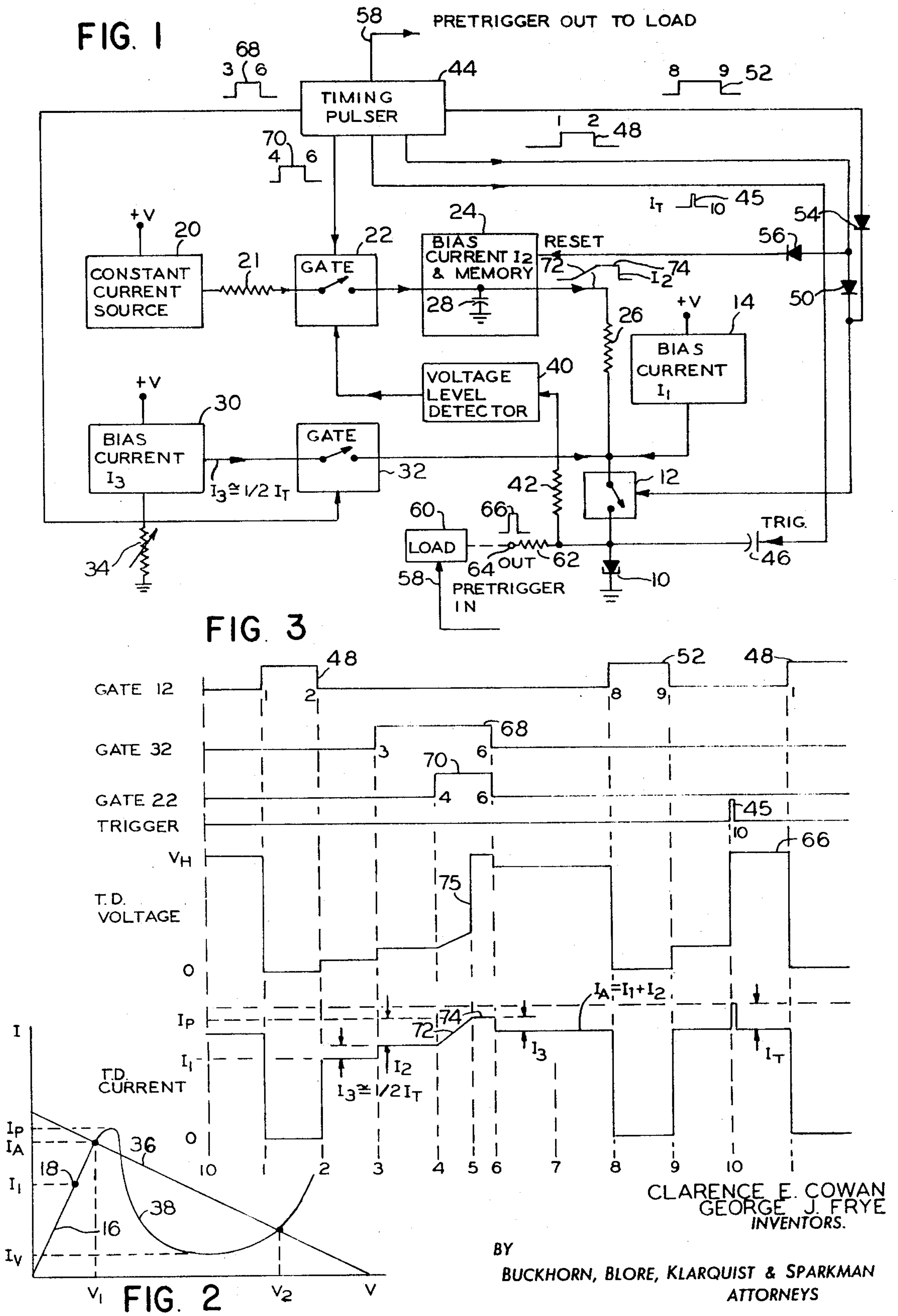
FIG. 1 is a schematic diagram of the electrical circuit of one embodiment of the triggered pulse generator of the present invention.
FIG. 2 shows the negative resistance forward current characteristic and load line for the tunnel diode in the pulse generator of FIG. 1.
FIG. 3 shows the waveforms of current and voltage signals produced in the circuit of FIG. 1.

As shown in FIG. 1, the triggered pulse generator of the present invention includes a tunnel diode 10 or other negative resistance device, such as an avalanche transistor or thyratron, connected as a bistable switching device. The cathode of the tunnel diode is grounded and its anode is connected to the output of a main gate 12 whose input is connected to a first DC bias current source 14. The first bias current $I_1$ supplied by current source 14 forward biases the tunnel diode in a low-voltage condition on the negative resistance characteristic curve 16 of the tunnel diode at point 18, as shown in FIG. 2. The first bias current $I_1$ is less than the arming current $I_A$ which is the minimum bias current necessary to enable triggering.

A substantially constant current source 20 is connected through a charging resistor 21 and a second gate 22 to a memory circuit 24. The output of the memory is connected through a coupling resistor 26 of high value, on the order of several thousand kilohms, through the main gate 12 to the tunnel diode 10. When the second gate 22 is operated by a gate pulse to close the gate switch, DC current flows through the charging resistor 21 and charges a storage capacitor 28 in the memory circuit 24 with a ramp voltage. As the ramp voltage on the storage capacitor 28 increases, it causes a linear ramp-shaped second bias current $I_2$ to flow from the output of the memory through the coupling resistor 26 to the input of gate 12. A third bias current $I_3$ flowing from a third DC current source 30 is transmitted through a third gate 32 to the input of the main gate 12 and added to the first and second bias current $I_1$ and $I_2$. The third bias current may be adjusted by a variable resistor 34 in the third bias current source 30 to provide such third bias current with a value which is a fraction of the current amplitude of a trigger pulse applied to the tunnel diode 10 to trigger such tunnel diode from a low-voltage state to a high-voltage state, as hereafter described. For example, the third bias current $I_3$ may be approximately equal to one-half the trigger current pulse.

When the total bias current flowing through the tunnel diode 10 or other negative resistance device exceeds the peak current $I_p$ of FIG. 2, the tunnel diode switches from a low-voltage stable state $V_1$ to a high-voltage stable state $V_2$. These two stable states are determined in a conventional manner by the points of intersection of a load line 36 with the first positive slope portion and the second positive slope portion of the tunnel diode characteristic. It should be noted that a negative resistance portion 38 of the tunnel diode characteristic curve lies intermediate between the two positive slope portions. Thus, the tunnel diode 10 of FIG. 1 is connected in a conventional manner as a bistable switching device.

A voltage level detector circuit 40 is connected at its input through an isolation resistor 42 to the anode of the tunnel diode 10 to sense when such tunnel diode switches from a low-voltage state to a high-voltage state. When this happens, the output of the detector 40 connected to the second gate 22 causes such gate switch to open, thereby stopping further charging of the storage capacitor 28 and terminating the ramp portion of the second bias current $I_2$. The maximum ramp voltage is then stored in the memory capacitor 28 so that such capacitor supplies a constant second bias current which is transmitted through the isolation resistor 26 to the tunnel diode until the memory is reset and capacitor 28 discharged.

A timing oscillator pulser 44 is provided to supply gating pulses to the main gate 12, the second gate 22 and the third gate 32 at appropriate times hereafter described with respect to FIG. 3. In addition, the timing pulser 44 also supplies a trigger pulse 45 through a coupling capacitor 46 to the anode of tunnel diode 10 in order to trigger such tunnel diode after it has been armed by adjusting the bias current to the arming level $I_A$ automatically in accordance with the present invention. The timing pulser 44 applies two gating pulses to main gate 12 during one cycle of operation, including a first gate pulse 48 transmitted through a diode 50 and a second pulse 52 transmitted through a diode 54 having their cathodes connected in common to such main gate. In addition, the first pulse 48 is also transmitted through a diode 56 to the memory 24 to reset such memory and discharge the storage capacitor 28. The timing pulser 44 may be provided with a pretrigger output conductor 58 which is connected to a load 60 at the output of the pulse generator. Thus, the anode of the tunnel diode in connected through a coupling resistor 62 to an output terminal 64 of the pulse generator and applies output pulses 66 to load 60 when such tunnel diode switches. The pretrigger pulse is produced by pulser 44 at a time immediately prior to the production of trigger pulse 45 in order to enable the load 66 to be triggered by the output pulse 66 of the tunnel diode. This prevents premature triggering of the load by those output pulses produced during the nontriggered switching of the tunnel diode which is sensed by the detector 40 to stop the ramp portion of the second bias current, as hereafter described.

The operation of the trigger pulse generator of FIG. 1 is best understood by referring to the waveform diagram of FIG. 3 which shows the gating pulses and other signals produced during one cycle of operation in time relationship with each other. The first gating pulse 48 is applied to the main gate 12 and opens the gate switch to stop all bias current flowing to the tunnel diode, thereby resetting the tunnel diode at time 1. At the same time, this first gate pulse is transmitted to the memory 24 as a reset pulse to discharge the storage capacitor 28 to zero. Gates 22 and 32 are quiescently in the open switch position shown so that upon termination of the first gate pulse 48, which again closes the main gate switch 12, only the first bias current $I_1$ flows to the tunnel diode. This causes the current flowing through the tunnel diode to increase from zero to level $I_1$ at time 2, which corresponds to point 18 on the characteristic curve 16 of FIG. 2. At time 3, a second gate pulse 68 is produced by the pulser 44 and applied to the third gate 32 to close such gate switch and cause the third bias current $I_3$ to be added to the first bias current flowing through the tunnel diode. The value of the third bias current is a fraction of the amplitude of the trigger current pulse 45 and may be typically about one-half the trigger current. At time 4, the pulser 44 produces a third gating pulse 70 which is applied to the second gate 22 causing such gate to close and connect the constant current source 20 to the memory 24, thereby starting the linear ramp current portion 72 of the second bias current $I_2$ which is produced due to charging of the storage capacitor 28. This second bias current is added to the first bias current and the third bias current already flowing through the tunnel diode, and causes the total bias current of such tunnel diode to exceed the peak current $I_p$ at time 5. When this happens, the tunnel diode 10 switches from a low-voltage state to a high-voltage state and produces a large-amplitude positive voltage pulse portion 75 on the anode of such tunnel diode which is sensed by detector 40. The detector then opens the gate switch 22 to stop further charging of the storage capacitor 28. This terminates the ramp portion 72 of the second bias current and the resulting maximum ramp voltage stored on capacitor 28 provides a constant current portion 74 of the second bias current which results in a total bias current through gate 12 corresponding to the triggering level of the tunnel diode.

At time 6, the gating pulse 70 terminates enabling the gate 22 to stay in the open switch position to which it was moved by the detector output and, at the same time, gating pulse 68 terminates to cause gate switch 32 to reopen, thereby terminating the third bias current. This causes the total bias current flowing through the tunnel diode to reduce to an arming current $I_A$ equal to the switching current $I_p$ less the third bias current $I_3$. It should be noted that the second gate pulse 68 can be eliminated and the third gate 32 operated instead by the third gate pulse 70, which would mean that the third bias current would be added to the first bias current at time 4 corresponding to the start of the ramp portion of the second bias current.

The arming current $I_A$ is maintained during time 7 because the constant second bias current 74 is stored during time 7 and added to the first bias current $I_1$ to provide such arming current. At time 8, the gating pulse 52 opens gate 12 and resets the tunnel diode to its low-voltage state by decreasing the current to the tunnel diode below its valley current $I_V$ in FIG. 2. At time 9, the gate pulse 52 terminates and causes the main gate 12 to reclose. This causes the arming current $I_A$ to be again applied to the tunnel diode. In addition, a pretrigger pulse (not shown) may be produced on output 58 of the pulser 44 between times 9 and 10.

At time 10, the trigger pulse 45 is applied to the tunnel diode and triggers such tunnel diode to a high-voltage stable state. Thus, the tunnel diode is biased by the arming current $I_A$ to a current level which differs from the peak current $I_P$ of the tunnel diode by an amount $I_3$ less than the amplitude of the trigger pulse. The triggering of the tunnel diode 10 produces the leading edge of a positive voltage output pulse 66 which is transmitted to the output terminal 64 of the pulse generator circuit. The tunnel diode 10 is then reset by the leading edge of the next gating pulse 48 to terminate output pulse 66 due to a reopening of the main gate 12.

As a result of the above-described operation, the arming bias current supplied to the tunnel diode is adjusted between successive trigger pulses in order to compensate for any changes in the load or peak current value of such tunnel diode. In addition, this enables the use of trigger pulses of lower amplitude and thereby increases the sensitivity of the pulse generator and eliminates any possible waveform distortion in the output pulse of such pulse generator which can be produced by large-amplitude trigger pulses. Of course, rather than adjusting the bias before each trigger pulse, the operation described above may be modified for a less frequent adjustment of bias current, such as by using continuous trigger pulses and only adjusting the bias periodically.

It will be obvious to those having ordinary skill in the art that many changes may be made in the above-described detailed description of the preferred embodiment of the present invention without departing from the spirit of the invention. Therefore, the scope of the present invention should only be determined by the following claims.

We claim:

1. A triggered pulse generator circuit having an automatic bias adjustment in which the improvement comprises:

a bistable switching device having a negative resistance characteristic including a peak value above which said device switches from a first stable state to a second stable state, said device producing output pulses when switched by trigger pulses applied thereto;

first bias means for supplying a first bias of substantially constant value less than said peak value to said device for forward biasing said device quiescently in said first state;

second bias means including a memory means for applying a second bias to said device in addition to said first bias, said second bias increasing in value until the total bias of said device exceeds said peak value and switches said device to said second state;

detector means for sensing said switching of said device to said second state and for applying an output to said memory means to cause said memory to store the value reached by said second bias when said device switches;

said second bias means including arming means for subtracting an adjustment bias from the total bias formed by said first bias and said stored second bias to provide an arming bias, said adjustment bias being less than the amplitude of said trigger pulses; and control means for reducing said total bias sufficiently to reset said device to said first state, for applying said arming bias to the reset device to arm said device, for applying said trigger pulses to the armed device to trigger said device to the second state, and for resetting said memory means and the triggered device..

2. A pulse generator in accordance with claim 1 in which the switching device is a semiconductor device and the first bias, second bias, adjustment bias, and arming bias are all bias currents.

3. A pulse generator in accordance with claim 2 in which the second bias means produces a ramp-shaped second bias current.

4. A pulse generator in accordance with claim 2 in which the semiconductor switching device is a tunnel diode connected as a bistable switching circuit.

5. A pulse generator in accordance with claim 3 in which the control means includes a timing means for applying a timing pulse to said second bias means for starting the ramp-shaped second bias current which is stopped by the output of said detector means.

6. A pulse generator in accordance with claim 5 in which the timing means applies a timing pulse to said arming means to cause said predetermined amount of current to be added to the first bias current at least as early as the start of said ramp current and to be subtracted from the total bias current after the end of said ramp current.

7. A pulse generator in accordance with claim 4 in which the detector means is a voltage level sensing circuit which senses when the tunnel diode switches from a low-voltage first state to a high-voltage second state.

8. A pulse generator in accordance with claim 6 which also includes gate means operated by said timing means for controlling the flow of said first bias current, said second bias current, and said adjustment bias current.

9. A pulse generator in accordance with claim 1 which also includes a variable resistance for changing the amount of said adjustment bias.